May 27, 1958     T. J. MESH     2,836,739
ELECTRONIC LEVEL SENSITIVE APPARATUS
Filed April 10, 1956     2 Sheets-Sheet 1

INVENTOR.
THEODORE J. MESH
BY Chapin & Neal
ATTORNEYS

May 27, 1958
T. J. MESH
2,836,739
ELECTRONIC LEVEL SENSITIVE APPARATUS
Filed April 10, 1956
2 Sheets-Sheet 2
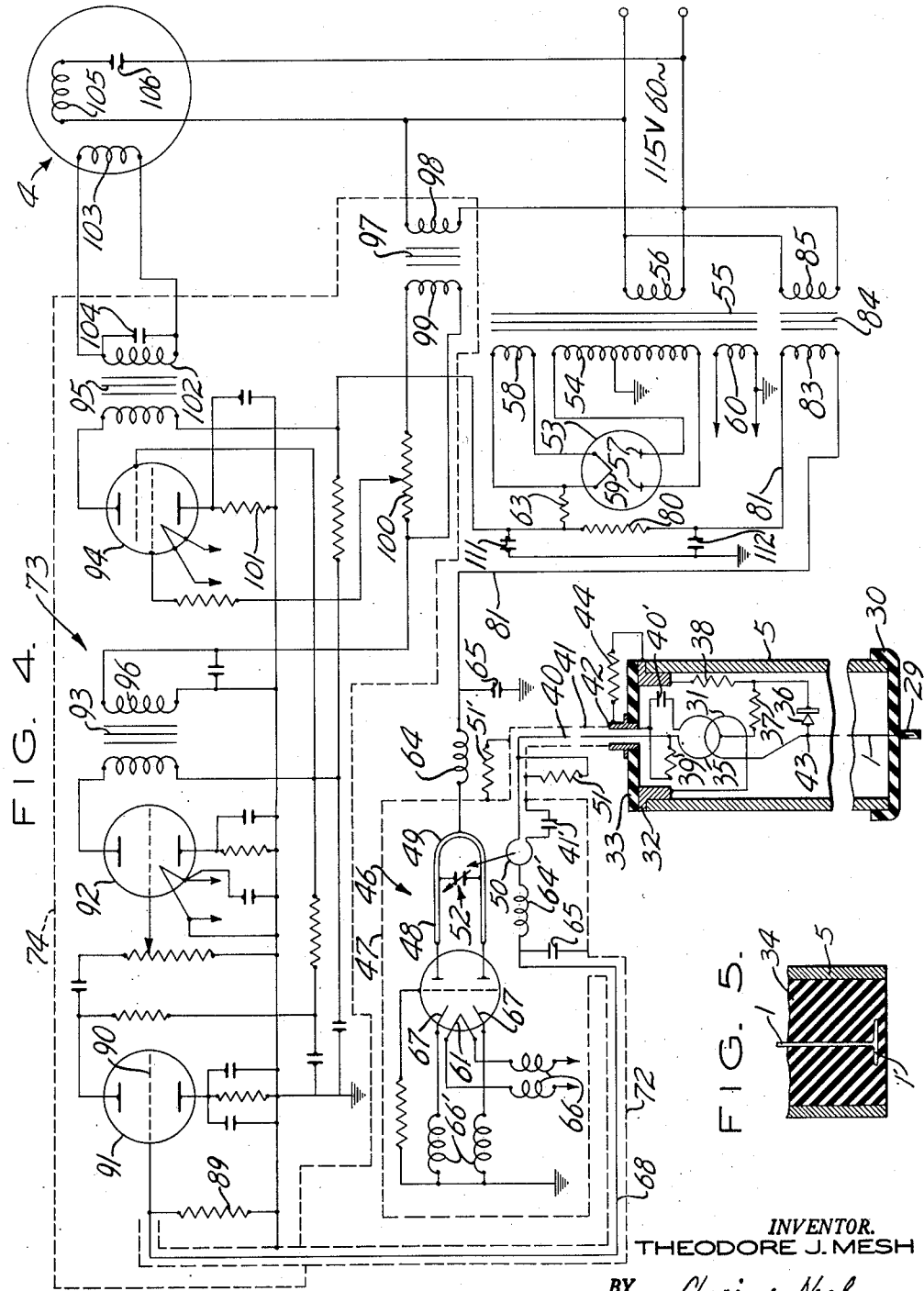
INVENTOR.
THEODORE J. MESH
BY Chapin & Neal
ATTORNEYS United States Patent Office 2,836,739
Patented May 27, 1958

2,836,739

ELECTRONIC LEVEL SENSITIVE APPARATUS

Theodore J. Mesh, Easthampton, Mass., assignor to Gilbert & Barker Manufacturing Company, West Springfield, Mass., a corporation of Massachusetts Application April 10, 1956, Serial No. 577,237

3 Claims. (Cl. 318—28)

This invention relates to an improved electronic level-sensitive apparatus for use with containers of liquid for the purpose of indicating the level of liquid therein.

More particularly, the invention is an improvement on that disclosed in U. S. Patent No. 2,682,026, granted June 22, 1954, on an invention of Theodore J. Mesh and Harry F. Tapp.

The invention, while capable of general application, finds one advantageous use in connection with storage tanks, such for example, as those used at refineries and elsewhere for the storage of petroleum products.

The object of this invention is to improve the apparatus of the above-named prior patent and make it suitable for measuring the level of the interface between a liquid that is a relatively good electrical conductor and is located in the lower portion of the storage tank and a liquid that is a relatively poor electrical conductor and of less specific gravity, for example, the interface between water and a petroleum product.

More particularly, the invention has for an object the provision of means which will exclude the petroleum product from the interior of the shield, in which the level-sensing element is mounted and prevents access of such product to all of the wire except for the extreme lower and thinly insulated end thereof that is adapted to penetrate the liquid to be measured to a slight extent.

The apparatus of the prior patent is not adapted to measure the interface between two such liquids, as above described. The level-sensing element of the apparatus is tuned in air, while out of contact with both liquids. Then, such element must descend through the petroleum product to the lower portion of the storage tank and penetrate into the water. After such tuning, the level-sensing element automatically starts downwardly but soon stops, because some of the petroleum product enters the shield and contacts portions of the level-sensing wire. The latter becomes detuned and stops. The wire may then be retuned in the petroleum product and will again move downwardly a little, penetrating slightly further into the petroleum product. Detuning of the wire again occurs, as more of the petroleum product enters the shield. Repeated tunings of the wire are necessary as it progressively enters the petroleum product and repeated detunings of the element occur until the shield becomes entirely filled with the petroleum product, whereupon another tuning of the element will enable it to move through the petroleum product into contact with the water in the lower part of the storage tank. The improvement of this invention enables the level-sensing element, after it has been tuned in air, to pass through the petroleum product without interruptions and without the necessity of repeated tunings of the element, such as above described.

The invention will be disclosed with reference to the accompanying drawings in which, Fig. 1 is a small-scale, fragmentary, sectional elevational view showing the mounting of the level-sensing element in a storage tank for petroleum products;

Fig. 4 is an electrical diagram of the apparatus; and

Fig. 5 is a fragmentary sectional elevational view, taken similarly to Fig. 2 but showing a further modification in the level-sensitive element and its shield.

Figure 1:
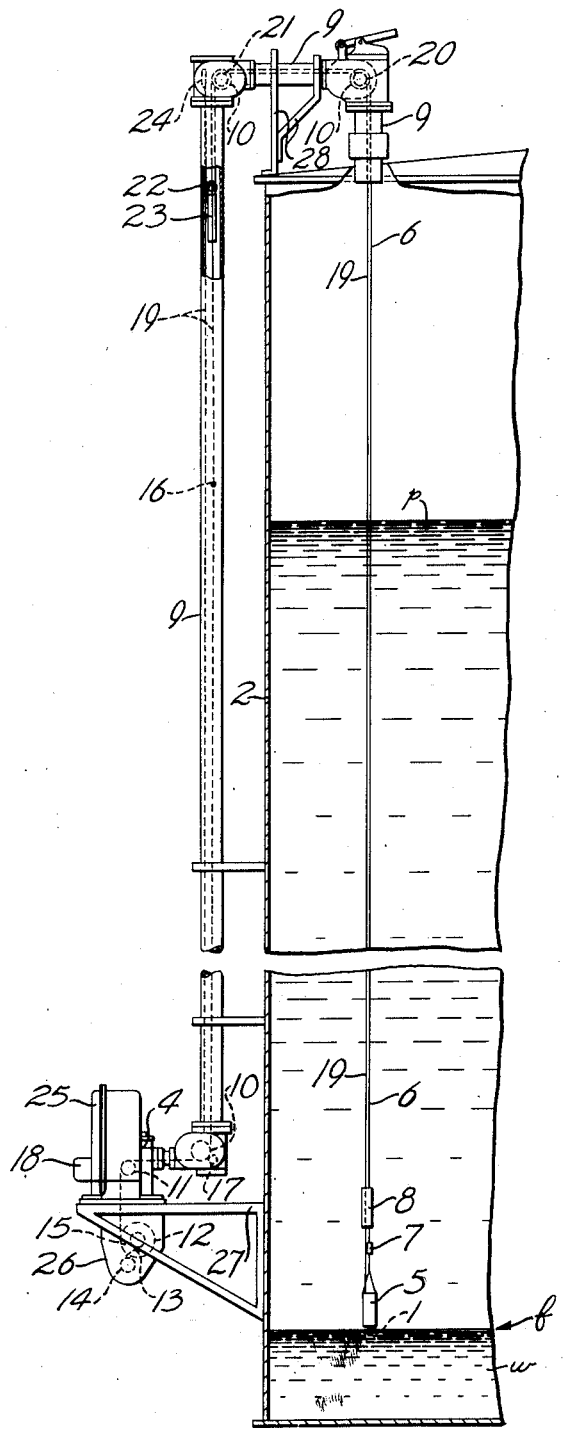

Referring to these drawings and first to Fig. 1 thereof; the level-sensing element, a wire 1, is mounted in upright position in a storage tank 2, containing a petroleum product $p$ and, beneath it, some water $w$. The lower end of wire 1 is adapted to be maintained immersed in the water a predetermined distance below the interface $f$ between the two liquids. The wire 1 is movable in response to changes in the level of the liquid $w$ under the control of a reversible two-phase electric motor 4, which in turn is controlled by a signal, derived from the level-sensing element 1 by any change in the predetermined vertical relationship between the element and liquid level $f$ and caused to effect a corrective movement of the element by raising or lowering it as may be necessary to restore the desired predetermined vertical relationship of the element and liquid level $f$.

As shown herein, the wire 1 is mounted within a tubular metallic shield 5, which is suspended from one end of a perforated tape 6, having interposed therein an insulating link 7 and a weight 8. This tape extends upwardly through the top of tank 2 into and through a conduit housing 9, which is fixed exteriorly of the tank and in which the tape is guided by means of a series of idler rolls 10 to a driver 11, usually a sprocket or pin wheel having teeth or pins to engage in the perforations of the tape. The driver 11 is actuated from the motor 4 through suitable reducing gearing (not shown) to cause the tape to move at the desired low speed, in this case at a maximum rate of 8 inches per minute. The other end of tape 6 is fixed to a drum 12, actuated by a spring 13, the ends of which are fixed one to each of two drums 14 and 15, the drum 15 being fixed to the winding drum 12. The spring 13 tends to turn drum 12 in a direction to wind up the tape 6 and thus raise the level-sensing element 1, while the weight 8 tends to lower such element, whenever permitted by the motor 4, which as above set forth, is actuated in response to variations in the level of the liquid $w$ in the tank. The extent of raising of the element 1 is limited by a stop pin 16, which is fixed to the tape 6 and is adapted to be arrested by engaging in the bight between the lowermost idler roll 10 and a supplementary idler roll 17. The tape 6 is thereby stopped and when it stops, the motor 4 stalls. A level indicator 18 is located adjacent the motor 4 and is suitably driven from roll 11.

Associated with the level-sensing element 1 is a coaxial cable represented in Fig. 1 as a single line 19 but shown in detail in Fig. 4. This cable extends upwardly into the described housing 9, around an idler roll 20 then horizontally outward to an idler roll 21 and thence downwardly to a roll 22, actuated by a weight 23, and thence upwardly to the top of the housing, where it is suitably clamped as indicated at 24, to the housing. From the clamp 24, the cable passes downwardly and then outwardly into a box 25, which houses the electronic equipment, later described. This control box, the motor 4, and a box 26, which houses the winding spring 13 and associated drums, are all supported from a shelf 27 suitably fixed to tank 2 near the base thereof. The housing 9 is supported from the top of tank 2 by the bracket 28 and from the motor 4.

Figure 2:
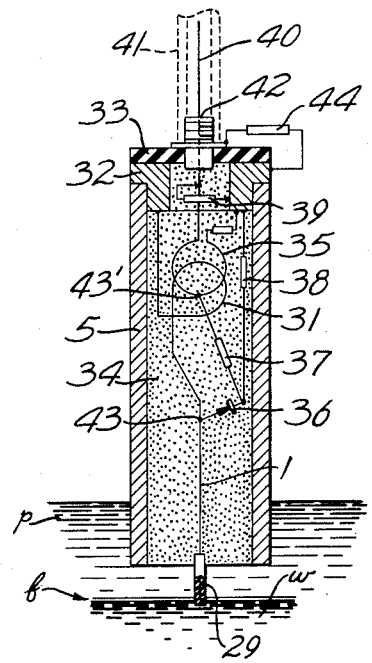
Fig. 2 is a sectional elevational view showing the level-sensing element and its mounting in the shield together with one means for excluding the petroleum product from entry into the shield.

The level-sensing element 1 and its associated elements are mounted as shown in Fig. 2. The sensing element itself consists of a suitable length (in this case about 8 inches) of wire, which is electrically-resonant at some predetermined high frequency, as for example, 160 megacycles. This wire is disposed substantially vertically within its tubular metallic shield 5 and its lower and sensitive end extends beyond the lower end of the shield and is covered with a thin-walled sleeve 29, of suitable insulating material, whereby the element may respond to the presence of water and be relatively insensitive to the presence of oil. The lower end of wire 1 is maintained, within close limits, at a predetermined distance below the interface $f$, such predetermined spacing being maintained by means, such as described in the above-named patent and shown in Fig. 2. The wire 1 has a coupling loop 31 formed near its upper end and such end is connected to a metallic bushing 32, which is suitably fixed in the upper end of the tubular shield 5 and has attached thereto an insulating disc 33, closing the upper end of the tube. The suspension means, such as indicated in Fig. 1, is usually attached to the bushing 32. In the upper end of the tube 5, is a wire loop 35, mounted in fixed coupling relation with loop 31; a rectifier or detector 36, which is preferably of the crystal diode type, such as a silicon diode for example; resistors 37, 38 and 39 and certain electrical connections. The ends of coupling loop 35 connect one with the wire 40 of the coaxial cable 19 and one with the shield 41 thereof (shown completely in Fig. 4), and the lower end of which is connected to a metallic fitting 42 fixed to disc 33. The connection of loop 35 to the shield is made through a .005 mfd. capacitor 40'. The detector 36 has one terminal electrically connected to the resonant wire at the point 43. Its other terminal is electrically connected through a coupling resistor 37, having in this case a resistance of 20,000 ohms, to the midpoint 43' of coupling loop 35 and through a load resistor 38, having in this case a resistance of 4700 ohms, to the bushing 32 and shield 5. When a signal is impressed on the resonant wire 1, by means to be later described, a fraction of the signal voltage is transmitted to the detector 36. The resistor 39 is an ordinary terminating resistor of 100 ohms resistance coupled across the wire 40 and shield 41 of the coaxial cable for the purpose of damping out standing waves. A resistor 44, also of 100 ohms resistance, is connected to bushing 32 and to fitting 42, which is electrically connected to the shield 41 of the coaxial cable, and is used to damp out standing waves on such shield. The values given are illustrative of some that have been found suitable and not as imposing limitations. The wire 1 and the described parts associated with it within shield 5 may be held in place by casting resin, indicated at 34, which according to the present invention completely fills the interior of the shield 5 and constitutes one means for excluding the petroleum product from access to those portions of wire 1 that are located within the shield.

Figure 3:
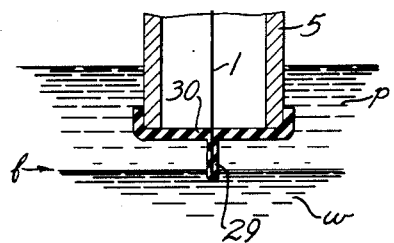
Fig. 3 is a fragmentary sectional elevational view, taken similarly to Fig. 2 but showing another means for excluding the petroleum product from access to those parts of the level-sensing element that are located within the shield.

Another means of excluding the petroleum product from the shield is shown in Fig. 3, where the lower end of the shield 5 is closed by a cap 30 of insulating material suitably fixed to the shield. Here, the dielectric between the wire 1 and shield 5 is air, while in the Fig. 2 example, the dielectric consists of the insulating resin 34. In each case, the dielectric between wire 1 and shield 5 is invariable and cannot therefore change as the shield dips into the petroleum product to varying degrees as it would in the construction shown in the above-named patent.

It is not necessarily essential that the lower end of the wire 1 extend below the lower end of shield 5 and an arrangement such as shown in Fig. 5 may be used. Here, the lower end of wire 1 has a horizontal portion 1' that is spaced slightly above the lower end of shield 5. The latter is completely filled with insulating material. The thickness of the insulation below the part 1' will correspond with the thickness of the described sleeve 29. That is, it will be relatively very small. The horizontal part 1' will provide substantially the same area to be immersed in the water $w$, as the Fig. 2 or Fig. 3 arrangements.

The electronic apparatus, whereby a signal, which is derived from wire 1 by a variation in the normal vertical relationship between the lower end of the wire 1 and the level of the interface $f$ is made to control the two-phase motor 4 substantially the same as in said patent and is shown diagrammatically in Fig. 4. A high frequency signal is impressed on the element 1 by any suitable means, such as the oscillator 46, which is of well known form and the parts of which are entirely enclosed within a suitable shield, indicated by the dotted lines 47. This is a low-power oscillator having a frequency range sufficient to include the natural frequency at which wire 1 is electrically resonant. The plate circuit coil of the oscillator consists of a piece of copper tubing 48, the semi-circular end of which forms a coupling loop 49. This loop is loosely coupled by an adjustable loop 50 to the coaxial cable, above described, and thus to loop 35, which is coupled as heretofore described, to the loop 31 of the resonant wire 1. One terminal of loop 50 is directly coupled to wire 41 and the other terminal is coupled through a .0005 mfd. capacitor 41' to the shield 41. 51 is an ordinary terminating resistor of 100 ohms bridged across the wire 40 and shield 41 of the coaxial cable to eliminate standing waves, and 51' is a resistor of 100 ohms connected between the shield 41 and the grounded shield 47 to eliminate standing waves on the shield. The wire 1 is part of a resonant load circuit normally tuned to the frequency of the oscillator. The tank circuit of the oscillator includes a variable condenser 52, by means of which the oscillator can be tuned to electrical resonance with the level-sensing element 1 by varying its frequency to match the natural frequency of wire 1. Power for the oscillator is derived from a full-wave rectifier 53, supplied from one secondary 54 of a transformer 55, the primary 56 of which is connected as indicated to a suitable source of alternating-current. The mid point of secondary 54 is grounded and its ends are connected one to each of the plates 57 of the rectifier. The transformer 55 also has a secondary 58 to supply current at 5 volts to the cathode 59 of the rectifier and a secondary 60 to supply current at 6.3 volts to the heating filament 61 of the oscillator tube 62. The rectifier 53 supplies the 300 volt direct current needed for the amplifying means to be later described and this voltage is reduced to the 200 volts needed for the oscillator by means of resistors 63 and 80, included in series in a wire 81, which connects the cathode 59 of the rectifier to the plate loop 49 of the oscillator. Included in series in the wire 81 is the secondary 83 of a transformer 84, the primary 85 of which is connected to the above-mentioned alternating current source. This secondary 83 supplies 60 cycle alternating current at 70 volts to effect a fifty percent modulation of the high frequency signal produced by the oscillator. The connection 81 to the oscillator includes a small radio-frequency choke 64 and is connected to one side of a by-pass condenser 65, the other side of which is grounded. The wire 68 has a shield 72 connected to the shield 47 of the oscillator. Similar small radio-frequency chokes 66 and 66' are respectively inserted in the supply wires of filament 61 and in the ground connection of cathodes 67. The oscillator is tuned to resonance with the wire 1, before the lower end of the latter becomes immersed in the liquid. A minute amount of power, say for example of the order of 1/100 of a watt, is transferred to wire 1, when the latter is in resonance, and at a low voltage, say for example in the neighborhood of one volt. This unimmersed position, in which wire 1 is tuned to resonance is not a normal working position but merely a preliminary tuning position, which is followed by immersion of the wire, as it is moved downwardly through the petroleum product until its lower end has penetrated into the water $w$. Then, the water causes substantial decrease in signal voltage, chiefly by detuning the resonant wire and also by its presence in the field of the wire. The signal will decrease in value approximately in direct proportion to the extent of immersion of the wire in the liquid, until a certain limit is reached (at about ⅛ inch) when the signal completely disappears. The detector 36 derives a portion of the signal from the resonant wire 1 and transmits it through the wires 40 of the radio-frequency cable to a wire 68, the high frequency component of the signal being excluded, by the choke 64' and bypass condenser 65.

The wire 68 is connected to a suitable amplifying means 73, herein comprising the elements represented within the shield enclosure indicated by dotted lines 74. The shield 72 of wire 68 is connected to the shield 73. Wire 68 is connected to one terminal of the input control resistor 89 and to the grid 90 of an amplifier tube 91. The other terminal of the resistor 89 is grounded to the shield 74. This amplifying means is of conventional form, designed for amplification of 60 cycle current with maximum efficiency. Only the alternating current component of the detected signal is amplified. The amplifying means comprises a preamplifier circuit having two triode stages, using the tube 91 and a tube 92; a power amplifier circuit, including the power amplifier tube 94; an output transformer 95; and an interstage transformer 93 the primary of which is included in the preamplifier circuit and the secondary 96 of which is included in the power amplifier circuit. The amplifier is supplied with 300 volt direct plate current from the full-wave rectifier 53. A gain of about 2000 is effected providing across the secondary 96 a 60 cycle signal of approximately 50 volts when the wire 1 is in resonance. A transformer 97, the primary 98 of which is connected to the above-named alternating current source, has a secondary 99 from which a 60 cycle voltage is derived and applied in series with the secondary 96 in the grid circuit of the power amplifier tube 94. The secondary 83, which supplies the 60 cycle alternating current modulation for the oscillator, and the secondary 99 which supplies adjustable 60 cycle current bias for the power amplifier grid are so connected that the signal across the secondary 96 is opposite in polarity to the alternating current derived from secondary 99. The signal across secondary 96 may, for example, vary from a maximum of about 50 volts, when the sensitive element 1 is in resonance, to zero, when the element is immersed to the predetermined depth in the liquid. The voltage derived from secondary 99 may, for example, be constant at say 15 volts. The differential voltage is amplified, say 20 times, in tube 94 and reduced one-half in transformer 95, appearing in the secondary 102 thereof as at least 150 volts, when the wire 1 is in resonance. The secondary 102 is connected to one winding 103 of the two-phase motor 4, and has bridged across it a power-factor correction condenser 104. The other winding 105 of the motor is connected to the 115 volt, 60 cycle, alternating-current supply through a condenser 106. When the wire 1 is in resonance, the 60 cycle current supplied to winding 103, will cause the motor 4 to turn in the direction necessary to lower the wire 1. As the wire 1 is lowered it becomes immersed in the water to various degrees and eventually the signal voltage across secondary 96 will equal the voltage derived from transformer secondary 99 and the differential voltage becomes zero, when the motor 4 will stop with the wire 1 immersed to the predetermined extent in the water. Now, if the level of the water rises, the voltage across secondary 96 will become less than that derived from secondary 99 and the differential voltage applied to winding 103 will be in an opposite direction, whereby the motor will reverse and lift the wire 1 until a balance is again obtained.

The invention modifies the shield of the level-sensing element by closing the lower end of the shield to exclude the entry of liquid into the shield. The insulator 29, or in the Fig. 5 form the insulation below wire part 1' allows the level-sensing element 1 to respond to the presence of water and yet be relatively insensitive to the petroleum product. The exclusion of liquid from the shield enables it to pass from the preliminary tuning position, wherein it is located entirely in the air above the surface of the petroleum product, downwardly through such product until the lower end of wire 1 becomes immersed to the desired predetermined depth in the water. Except for the closures for the lower end of the shield, the petroleum product could enter the shield engage the wire 1 above its lower end and cause detuning of the wire and the consequent stoppage of the wire long before it had reached its intended destination. Stated another way, the dielectric between the shield and the wire 1, will, with the structure of said patent, vary as more and more liquid enters the shield with the results, above set forth, that the shield cannot be made to pass through the petroleum product without repeated detunings and stoppages and repeated retunings. This invention provides for the dielectric between the wire and shield to be invariable so that that the wire cannot be detuned as it enters the petroleum product. The invention therefore renders the structure of said patent operative for a new use, being that of indicating the level of the interface between two liquids of different electrical conductivity and specific gravity, enabling it to respond only to variations in the level of the liquid of greater specific gravity and better electrical conductivity.

What is claimed is:

1. In an electronic level-sensitive control, adapted for use with containers of immiscible liquids of different specific gravity for measuring the level of the interface between the liquids, the heavier liquid being a relatively good conductor of electricity and the lighter liquid being a relatively poor conductor of electricity, such control being of the type wherein the level-sensing element consists of an upright wire mounted inside and spaced a substantial distance from the peripheral wall of a tubular metallic shield and having its lower end prevented from contact with the liquid by a relatively thin wall of insulation, such wire being electrically resonant at a predetermined frequency, a high-frequency low-power oscillator coupled to said wire near its other end and tuned to electrical resonance with the wire while the latter is out of contact with either liquid for producing in the wire a high-frequency low-voltage signal, and wherein the lower end of said wire is maintained within close limits immersed to a predetermined depth in the heavier and relatively conducting liquid, and a differential variation in the level of the heavier liquid causes a change in the amplitude of the signal to effect a corrective movement of the wire to restore the predetermined degree of immersion of its lower end in the heavier liquid; that improvement which comprises a means for completely excluding said liquids from the interior of said shield to maintain invariable the dielectric between the wire and shield during their passage from the tuning position in air into and through the lighter liquid into the position wherein the lower end of the wire is immersed in the heavier liquid.

2. The combination, as claimed in claim 1, in which the liquid-excluding means consists of a closure of insulating material for the lower end of the shield.

3. The combination, as claimed in claim 1, in which the liquid-excluding means consists of insulation completely filling the space between the wire and shield.

References Cited in the file of this patent

UNITED STATES PATENTS 2,682,026     Mesh et al.               June 22, 1954

UNITED STATES PATENT OFFICE
CERTIFICATE OF CORRECTION

Patent No. 2,836,739                                                          May 27, 1958

Theodore J. Mesh

It is hereby certified that error appears in the printed specification of the above numbered patent requiring correction and that the said Letters Patent should read as corrected below.

Column 3, line 32, for ".005 mfd." read -- .0005 mfd. --; line 38, for "4700 ohms," read -- 47000 ohms, --.

Signed and sealed this 22nd day of July 1958.

(SEAL)
Attest:

KARL H. AXLINE                                                       ROBERT C. WATSON
Attesting Officer                                                  Commissioner of Patents